United States Patent [19]

de Montigny et al.

[11] 4,355,171
[45] Oct. 19, 1982

[54] PREPARATION OF POLYSILOXANE/POLYOXYALKYLENE COPOLYMER USEFUL AS STABILIZERS IN MAKING POLYURETHANE FOAMS

[75] Inventors: Armand de Montigny, Leverkusen; Hans-Walter Illger, Roesrath; Alberto C. Gonzalez-Doerner, Leverkusen; Hans-Heinrich Moretto, Cologne, all of Fed. Rep. of Germany

[73] Assignee: Bayer Aktiengesellschaft, Leverkusen, Fed. Rep. of Germany

[21] Appl. No.: 165,571

[22] Filed: Jul. 2, 1980

[30] Foreign Application Priority Data

Jul. 21, 1979 [DE] Fed. Rep. of Germany ........ 2929588

[51] Int. Cl.³ ............................. C07F 7/08; C07F 7/18
[52] U.S. Cl. ...................................... 556/446; 556/457
[58] Field of Search ................................ 556/446, 457

[56] References Cited

U.S. PATENT DOCUMENTS

| | | | |
|---|---|---|---|
| 3,170,894 | 2/1965 | Brown et al. | 556/446 X |
| 3,272,762 | 9/1966 | Ibbotson et al. | 556/446 X |
| 3,356,758 | 12/1967 | Omietanski et al. | 556/446 |
| 3,480,583 | 11/1969 | Bailey et al. | 556/446 |
| 3,526,651 | 9/1970 | Rossmy et al. | 556/446 |
| 3,532,732 | 10/1970 | Rossmy et al. | 556/446 |
| 3,555,063 | 1/1971 | Nakajima et al. | 556/446 |
| 3,801,616 | 4/1974 | Litteral | 556/446 |
| 3,836,560 | 9/1974 | Prokai et al. | 556/446 |
| 3,980,688 | 9/1976 | Litteral et al. | 556/446 |

Primary Examiner—Paul F. Shaver
Attorney, Agent, or Firm—Sprung, Horn, Kramer & Woods

[57] ABSTRACT

Polyorganopolysiloxane/polyoxyalkylene block compolymers suitable for use as stabilizers in making soft polyurethane foams, of the formula

[R¹Si(OSiR₂)ₙ]ₘZₘ₋₁(OR²)ₘ₊₂ 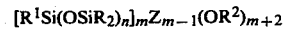

in which
R is an optionally halogen-substituted alkyl group with up to 4 C atoms,
R¹ is the substituent R or a phenyl radical,
R² is an aliphatic, optionally unsaturated radical with up to 18 C atoms or a group of the formula

R³(OCH₂CH₂)ₓ(OCH₂CH)ᵧ—,

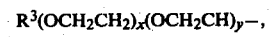

Z is the difunctional unit —O— or

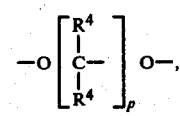

R³ is a hydrocarbon radical with up to 4C atoms,
R⁴ each independently is a hydrogen atom or R³,
n is from 3 to 30,
m is from 1 to 15,
x is from 0 to 68,
y is from 0 to 52,
x+y is from 1 to 68, and
P is from 2 to 12, are produced by reacting an organopolysiloxane of the formula R¹Si(OSiR₂)ₙ U₃₋ₐ₋ᵦClₐWᵦ 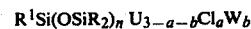

in which
U is a radical of a lower monobasic carboxylic acid with up to 4 C atoms,
W is a radical of a fluorinated alkanesulphonic acid,
a ≦ 1, and
b ≦ 0,5, with a mixture of R²OH and H-Z-H, in the presence of a base in an organic solvent, the relative proportion of the reactants being determined by the value of m.

2 Claims, No Drawings

PREPARATION OF POLYSILOXANE/POLYOXYALKYLENE COPOLYMER USEFUL AS STABILIZERS IN MAKING POLYURETHANE FOAMS

The present invention relates to a process for the preparation of polysiloxane/polyoxyalkylene copolymers, which can be used as surface-active agents in the production of polyurethane foams.

It is known that polysiloxane/polyoxyalkylene copolymers can be used as release agents, anti-misting agents, lubricants, additives to paints and the like, and it is also known that they are particularly suitable as foam stabilizers in the production of polyurethane foams. Various types of siloxane/polyoxyalkylene copolymers have thus already been prepared. These can be divided into two groups, and in particular according to the type of bond between the siloxane part and the polyoxyalkylene part, the first being the SiOC type and the second the SiC type.

In general, the preparation of those block copolymers in which the blocks are linked via SiOC bonds is preferred (compare, for example, DE-AS (German Published Specification) 1,595,730, DE-OS (German Published Specification) 2,413,987 or DE-OS (German Published Specification) 1,745,423).

A very frequent disadvantage of the known processes is that the siloxane blocks must be prepared via reverse hydrolyses, that is to say by tedious processes, or via additional roundabout routes (for example as in DE-OS (German Published Specification) 1,745,423). It is also frequently necessary to use starting materials which are to be prepared separately, in which case, in addition, no silicofunctional blocks which react spontaneously with hydroxyl bonded to carbon are formed (DE-OS) (German Published Specification) 2,413,987).

An object of the present invention was thus to provide a process in which the siloxane block can be built up rapidly and reliably from starting materials which are obtained on a large industrial scale, and in which the linking of the siloxane blocks and polyoxyalkylene blocks takes place virtually spontaneously.

The present invention relates to a process for the preparation of polyorganosiloxane/polyoxyalkylene block copolymers of the general formula $$[R^1Si(OSiR_2)_n]_m Z_{m-1}(OR^2)_{m+2}$$

in which

R represents an optionally halogen-substituted alkyl group with up to 4 C atoms,
$R^1$ represents the substituent R or a phenyl radical,
$R^2$ represents an aliphatic, optionally unsaturated radical with up to 18 C atoms or a group having the formula

$$R^3(OCH_2CH_2)_x(OCH_2CH)_y-$$
$$\quad\quad\quad\quad\quad\quad\quad\quad\quad\quad CH_3$$

and
Z represents a difunctional unit such as —O— or

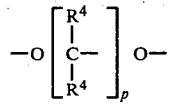

$$-O\left[\begin{array}{c}R^4\\|\\C-\\|\\R^4\end{array}\right]_p O-$$

wherein
$R^3$ denotes a hydrocarbon radical with up to 4 C atoms,
the symbols $R^4$ are identical or different and denote a hydrogen atom or $R^3$,
n denotes a number between 3 and 30,
m denotes a number between 1 and 15,
x denotes a number between 0 and 68,
y denotes a number between 0 and 52,
x+y denotes a number between 1 and 68 and
p denotes a number between 2 and 12,
which is characterized in that an organopolysiloxane of the general formula

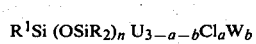

$$R^1Si(OSiR_2)_n U_{3-a-b}Cl_a W_b$$

in which
U represents a radical of a lower monobasic carboxylic acid with up to 4 C atoms, preferably an acetate radical, and
W represents a radical of a fluorinated alkanesulphonic acid,
and wherein
a is equal to or less than 1 and
b is equal to or less than 0.5
which is obtained by reacting $R^1SiCl_3$ with a diorganopolysiloxane in the presence of a fluorinated alkanesulphonic acid or salts thereof, in an excess monobasic carboxylic acid, is reacted with a mixture of $R^2OH$ and H-Z-H, the composition of which is determined by the index m, in the presence of a base, in an organic solvent, The present invention furthermore relates to the use of polyorganopolysiloxane/polyether compounds, obtained according to the invention, as stabilizers for soft polyurethane foams.

The process according to the invention has the advantage that a polyorganopolysiloxane with ≡SiX groups, X mainly denoting the radical of a carboxylic acid, for example acetate or propionate, which is readily and rapidly available can be used as the starting material. Depending on the reaction procedure, X is present to a small extent as chlorine. X can denote, also to a minor extent, the radical of the fluorinated alkanesulphonic acid employed as the catalyst, for example —O$_3$—SC$_4$F$_9$. The preparation of these polyorganosiloxanes is described, for example, in DE-OS (German Published Specification) 2,802,668 or DE-OS (German Published Specification) 2,855,927. It is effected by reacting a chlorosilane or partial hydrolysis products thereof with linear or cyclic organosiloxanes in the presence of a combination of a catalyst from the series comprising fluorinated alkanesulphonic acids or salts thereof, and excess monobasic carboxylic acid, for example acetic acid or propionic acid. These compounds are characterized in that, in contrast to the siloxane blocks described in DE-OS (German Published Specification) 2,413,987, in the presence of a proton acceptor they react virtually spontaneously with hydroxyl groups bonded to carbon, thanks to the end groups described above. They differ from the precursors employed in DE-AS (German Published Specification) 1,595,730 principally by the fact that they can contain no

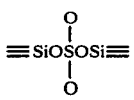

groupings. These units, which likewise react spontaneously with hydroxyl groups bonded to carbon, can lead to undesired by-products. The process is additionally characterized in that the siloxane block is on average branched only once. However, since the degree of branching can be established simultaneously with the linking of the polysiloxane blocks and polyoxyalkylene blocks, because of the reactivity of the siloxane block employed according to the invention, the desire for more highly branched end products is fulfilled. This manner of controlling the degree of branching has the advantage that a large number of very differently branched end products can be obtained starting from a single polyorganosiloxane of a defined composition. The separate preparation of the polysiloxane precursor concerned, which is necessary for each desired degree of branching of the end product, is thus eliminated. As can be shown below, the degree of branching is controlled simultaneously, that is to say without additional effort, with the linking of the blocks. This is achieved by mixing the monofunctional (with respect to the hydroxyl end group) polyoxyalkylene blocks with difunctional (with respect to the hydroxyl group) compounds in calculated ratios and simultaneously reacting them with the chosen polyorganopolysiloxane in an organic solvent, in the presence of a proton acceptor.

At a low concentration, the products prepared according to the invention already show good stabilizing properties in the production of polyurethane foams. The resulting foams are distinguished by a finely porous structure and very good open-cell characteristics.

Polyethers of the formula

the OH number of which varies between 22 and 50 and in which the value x varies between 8 and 40, are preferably used as starting materials for the process according to the invention. However, in certain cases, x can be 0. The value of y is preferably between 6 and 30.

The preparation of the polyorganopolysiloxanes which can be used is described in DE-OS (German Published Specification) 2,802,668, but according to the invention products which have been prepared in the presence of sulphuric acid as the catalyst are less suitable.

Examples of the R groups are the methyl, chloromethyl, ethyl and propyl radicals; $R^3$ is preferably a $OC_4H_9$ radical, but $CH_3O-$, $C_2H_5O-$, $C_3H_7O-$ and $C_3H_5O-$ radicals are also possible.

Examples of the compound H-Z-H are

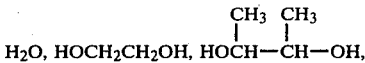

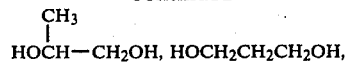

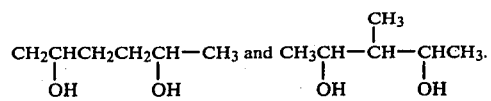

Compounds with secondary OH groups are particularly suitable. The value of m in the finished product is preferably between 1 and 10 and the value of n is between 6 and 24.

The reaction is in general carried out by a procedure in which the polyorganosiloxane is mixed with a solvent, preferably with an aromatic solvent, such as, for example, toluene or xylene, and the mixture is then stirred rapidly with a mixture of $R^2OH$, H-Z-H and toluene. About the stoichiometric amount of $NH_3$ is passed into this mixture at room temperature. An excess of $NH_3$ is then passed in and the mixture is stirred at about 70° C. for about 1 hour. After cooling, the salt which has precipitated is filtered off and the solvent is removed from the filtrate at about 100° C. in vacuo. These preferred reaction conditions can, of course, also be adapted to the particular requirements and thus deviate from those mentioned here.

The yellowish-colored clear solutions obtained have a viscosity between 600 and 3,500 cP, depending on their composition.

These products are suitable as stabilizers in the production of soft polyurethane foams.

For a long time, polyurethane foams have been produced on an industrial scale by the isocyanate polyaddition process from compounds with several active hydrogen atoms, in particular compounds containing hydroxyl and/or carboxyl groups, and polyisocyanates, if appropriate water, activators, emulsifiers, foam stabilizers and other additives also being used (R. Vieweg and A. Höchtlein, Kunststoff-Handbuch (Plastics Handbook), Volume VII, Polyurethane (Polyurethanes), Hanser-Verlag Munich 1966).

The following components are employed in the production of polyurethane foams: 1.

As starting components: aliphatic, cycloaliphatic, araliphatic, aromatic and heterocyclic polyisocyanates, such as are described, for example, by W. Siefken in Justus Liebigs Annalen der Chemie 562, pages 75 to 136, for example those of the formula

in which n denotes 2, 3 or 4, preferably 2, and

Q denotes an aliphatic hydrocarbon radical with 2–18, preferably 6–10, C atoms, a cycloaliphatic hydrocarbon radical with 4–15, preferably 5–10, C atoms, an aromatic hydrocarbon radical with 6–15, preferably 6–13, C atoms or an araliphatic hydrocarbon radical with 8–15, preferably 8–13, C atoms, for example ethylene diisocyanate, tetramethylene 1,4-diisocyanate, hexamethylene 1,6-diisocyanate, dodecane 1,12-diisocyanate, cyclobutane 1,3-diisocyanate, cyclohexane 1,3- and 1,4-diisocyanate and any desired mixtures of these isomers, 1isocyanato-3,3,5-trimethyl-5-isocyanatomethyl-cyclohexane (DE-Auslegeschrift (German Published Specification) 1,202,785 and U.S. Pat. No. 3,401,190), hexahydrotoluylene 2,4- and 2,6-diisocyanate and any desired mixtures of these isomers, hexahydrophenylene 1,3- and/or 1,4-diisocyanate, perhydro-diphenylmethane 2,4'- and/or 4,4'-diisocyanate, phenylene 1,3- and 1,4-diisocyanate, toluylene 2,4- and 2,6-diisocyanate and any desired mixtures of these isomers, diphenylmethane 2,4'- and/or 4,4'-diisocyanate and naphthylene 1,5-diisocyanate.

Examples of further compounds which are possible according to the invention are: triphenylmethane 4,4',4''-triisocyanate, polyphenyl-polymethylene polyisocyanates, such as are obtained by aniline-formaldehyde condensation and subsequent phosgenation and are described, for example, in British Pat. Nos. 874,430 and 848,671, m- and p-isocyanatophenylsulphonyl isocyanates according to U.S. Pat. No. 3,454,606, perchlorinated aryl polyisocyanates, such as are described, for example, in DE-Auslegeschrift (German Published Specification) 1,157,601 (U.S. Pat. No. 3,277,138), polyisocyanates containing carbodiimide groups, such as are described in German Pat. No. 1,092,007 (U.S. Pat. No. 3,152,162) and in DE-Offenlegungsschriften (German Published Specifications) 2,504,400, 2,537,685 and 2,552,350, norbornane diisocyanates according to U.S. Pat. No. 3,492,330, polyisocyanates containing allophanate groups, such as are described, for example, in British Pat. No. 994,890, Belgian Pat. No. 761,626 and Dutch Patent Application 7,102,524, polyisocyanates containing isocyanurate groups, such as are described, for example, in U.S. Pat. No. 3,001,973, in German Pat. Nos. 1,022,789, 1,222,067 and 1,027,394, and in DE-Offenlegungsschriften (German Published Specifications) 1,929,034 and 2,004,048, polyisocyanates containing urethane groups, such as are described, for example, in Belgian Pat. No. 752,261 or in U.S. Pat. Nos. 3,394,164 and 3,644,457, polyisocyanates containing acylated urea groups, according to German Pat. No. 1,230,778, polyisocyanates containing biuret groups, such as are described, for example, in U.S. Pat. Nos. 3,124,605, 3,201,372 and 3,124,605 and in British Pat. No. 889,050, polyisocyanates prepared by telomerization reactions, such as are described, for example, in U.S. Pat. No. 3,654,106, polyisocyanates containing ester groups, such as are mentioned, for example, in British Pat. Nos. 965,474 and 1,072,956, in U.S. Pat. No. 3,567,763 and in German Pat. No. 1,231,688, reaction products of the abovementioned isocyanates with acetals, according to German Pat. No. 1,072,385, and polyisocyanates containing polymeric fatty acid esters, according to U.S. Pat. No. 3,455,883.

The distillation residues, containing isocyanate groups, obtained in the industrial preparation of isocyanate can also be employed, if appropriate dissolved in one or more of the abovementioned polyisocyanates. It is furthermore possible to use any desired mixtures of the abovementioned polyisocyanates. Polyisocyanates which are particularly preferred are, as a rule, the polyisocyanates which are readily available industrially, for example toluylene 2,4- and 2,6-diisocyanate and any desired mixtures of these isomers ("TDI"), polyphenyl-polymethylene polyisocyanates, such as are prepared by aniline-formaldehyde condensation and subsequent phosgenation ("crude MDI"), and polyisocyanates containing carbodiimide groups, urethane groups, allophanate groups, isocyanurate groups, urea groups or biuret groups ("modified polyisocyanates"), in particular those modified polyisocyanates which are derived from toluylene 2,4- and/or 2,6-diisocyanate or from diphenylmethane 4,4'- and/or 2,4'-diisocyanate.

2. Also as starting components: compounds which have a molecular weight of, as a rule, 400–10,000 and have at least two hydrogen atoms which are reactive towards isocyanates. By such compounds there are understood, in addition to compounds containing amino groups, thiol groups or carboxyl groups, preferably compounds containing hydroxyl groups, in particular compounds containing two to eight hydroxyl groups, and especially those of molecular weight 1,000 to 6,000, for example polyesters, polyethers, polythioethers, polyacetals, polycarbonates and polyester-amides containing at least two, as a rule 2 to 8, but preferably 2 to 4, hydroxyl groups, such as are in themselves known for the preparation of homogeneous polyurethanes and of cellular polyurethanes;

(a) The polyesters containing hydroxyl groups which can be used are, for example, reaction products of polyhydric, preferably dihydric and optionally additionally trihydric, alcohols with polybasic, preferably dibasic, carboxylic acids. Instead of the free polycarboxylic acids, it is also possible to use the corresponding polycarboxylic acid anhydrides or corresponding polycarboxylic acid esters of low alcohols or mixtures thereof for the preparation of the polyesters. The polycarboxylic acids can be of an aliphatic, cycloaliphatic, aromatic and/or heterocyclic nature and can be optionally substituted, for example by halogen atoms, and/or unsaturated.

Examples which may be mentioned of such carboxylic acids and derivatives thereof are: succinic acid, adipic acid, suberic acid, azelaic acid, sebacic acid, phthalic acid, isophthalic acid, trimellitic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, and dimerized and trimerized unsaturated fatty acids, optionally mixed with monomeric unsaturated fatty acids, such as oleic acid; and terephthalic acid dimethyl ester and terephthalic acid bis-glycol ester. Possible polyhydric alcohols are, for example, ethylene glycol, propylene 1,2- and 1,3-glycol, butylene 1,4- and 2,3-glycol, hexane-1,6-diol, octane-1,8-diol, neopentylglycol, 1,4-bis-hydroxymethylcyclohexane, 2-methyl-propane-1,3-diol, glycerol, trimethylolpropane, hexane-1,2,6-triol, butane-1,2,4-triol, trimethylolethane, pentaerythritol, quinitol, mannitol and sorbitol, formitol, methyl glycoside, and furthermore diethylene glycol, triethylene glycol, tetraethylene glycol and higher polyethylene glycols, dipropylene glycol and higher polypropylene glycols, and dibutylene glycol and higher polybutylene glycols. The polyester can contain a proportion of terminal carboxyl groups. Polyesters from lactones, for example $\epsilon$-caprolactone, or from hydroxycarboxylic acids, for example $\omega$-hydroxycaproic acid, can also be employed.

(b) The polyethers which contain at least two, as a rule two to eight, preferably two to three, hydroxyl groups and can be used according to the invention are also those of a type which is in itself known and are prepared, for example, by polymerization of epoxides, such as ethylene oxide, propylene oxide, butylene oxide, tetrahydrofuran styrene oxide or epichlorohydrin, with themselves, for example in the presence of Lewis catalysts, such as $BF_3$, or by addition of these epoxides, preferably of ethylene oxide and propylene oxide, optionally as a mixture or successively, onto starting components with reactive hydrogen atoms, such as water, alcohols, ammonia or amines, for example ethylene glycol, propylene 1,3- or 1,2-glycol, trimethylolpropane, glycerol, sorbitol, 4,4'-dihydroxy-diphenylpropane, aniline, ethanolamine or ethylenediamine. Sucrose polyethers, such as are described, for example, in DE-Auslegeschriften (German Published Specifications) 1,176,358 and 1,064,938, and polyethers started from formitol or formose (DE-Offenlegungsschriften (German Published Specifications) 2,639,083 and 2,737,951) can be used according to the invention. Those polyethers which predominantly contain primary OH groups (up to 90% by weight, relative to all the OH groups present in the polyether) are in many cases preferred. Polybutadienes containing OH groups are also suitable according to the invention.

(c) Amongst the polythioethers which may be mentioned are, in particular, the condensation products of thiodiglycol with itself and/or with other glycols, dicarboxylic acids, formaldehyde, aminocarboxylic acids or aminoalcohols. Depending on the Co-components, the products are, for example, mixed polythioethers, polythioether esters or polythioether ester-amides.

(d) Possible polyacetals are, for example, the compounds which can be prepared from glycols, such as diethylene glycol, triethylene glycol, 4,4'-dihydroxyethoxy-diphenyldimethylmethane or hexanediol, and formaldehyde. Polyacetals which are suitable according to the invention can also be prepared by polymerization of cyclic acetals, such as, for example, trioxane (DE-Offenlegungsschrift (German Published Specification) 1,694,128).

(e) Possible polycarbonates containing hydroxyl groups are those of a type which is in itself known, which can be prepared, for example, by reacting diols, such as propane-1,3-diol, butane-1,4-diol and/or hexane-1,6-diol, diethylene glycol, triethylene glycol, tetraethylene glycol or thiodiglycol with diarylcarbonates, for example diphenyl carbonate, or phosgene (DE-Auslegeschriften (German Published Specifications) 1,694,080, 1,915,908 and 2,221,751; and DE-Offenlegungsschrift (German Published Specification) 2,605,024).

(f) The polyester-amides and polyamides include, for example, those obtained from polybasic saturated or unsaturated carboxylic acids or anhydrides thereof and polyfunctional saturated or unsaturated aminoalcohols, diamines, polyamines and mixtures thereof, predominantly linear condensation products.

(g) Polyhydroxy compounds which already contain urethane or urea groups, and optionally modified naturally occurring polyols, such as castor oil, or carbohydrates, for example starch, can also be used. It is also possible to employ, according to the invention, addition products of alkylene oxides and phenol/formaldehyde resins or urea/formaldehyde resins.

(h) The polyhydroxy compounds mentioned can be further modified in the most diverse manner before their use in the polyisocyanate polyaddition process: thus, according to DE-Offenlegungsschriften (German Published Specifications) 2,210,839 (U.S. Pat. No. 3,849,515) and 2,544,195, a mixture of various polyhydroxy compounds (for example of a polyether-polyol and a polyester-polyol) can be subjected to a condensation reaction by etherification in the presence of a strong acid to give a higher-molecular polyol which is built up from various segments bonded via ether bridges. It is also possible, for example according to DE-Offenlegungsschrift (German Published Specification) 2,559,372, to introduce amide groups into the polyhydroxy compounds or, according to DE-Offenlegungsschrift (German Published Specification) 2,620,487, to introduce triazine groups by reaction with polyfunctional cyanic acid esters. Polyhydroxy compounds containing guanidine, phosphonoformamidine or acylurea groups are obtained by reacting a polyol with less than the equivalent amount of a diisocyanato-carbodiimide and then reacting the carbodiimide group with an amine, amide, phosphite or carboxylic acid (DE-Offenlegungsschriften (German Published Specifications) 2,714,289, 2,714,292 and 2,714,293). In some cases, it is of particular interest to convert the higher-molecular polyhydroxy compounds completely or partly into the corresponding anthranilic acid esters by reaction with isatoic anhydride, such as is described in DE-Offenlegungsschriften (German Published Specifications) 2,019,432 and 2,619,840, and U.S. Pat. Nos. 3,808,250, 3,975,428 and 4,016,143. Higher-molecular compounds with terminal aromatic amino groups are obtained in this manner.

Higher-molecular compounds containing terminal amino groups are obtained, according to DE-Offenlegungsschrift (German Published Specification) 2,546,536 and U.S. Pat. No. 3,865,791, by reacting NCO-prepolymers with enamines, aldimines or ketimines containing hydroxyl groups and then hydrolyzing the products. Further preparation processes for higher-molecular compounds with terminal amino groups or hydrazide groups are described in DE-Offenlegungsschrift (German Published Specification) 1,694,152 (U.S. Pat. No. 3,625,871).

(i) Polyhydroxy compounds which contain high-molecular polyadducts or polycondensates or polymers in finely dispersed or dissolved form can optionally also be employed according to the invention. Such polyhydroxy compounds are obtained, for example, when polyaddition reactions (for example reactions between polyisocyanates and compounds containing amino groups) or polycondensation reactions (for example between formaldehyde and phenols and/or amines) are allowed to proceed in situ in the abovementioned compounds containing hydroxyl groups. Such processes are described, for example, in DE-Auslegeschriften (German Published Specifications) 1,168,075 and 1,260,142 and DE-Offenlegungsschriften (German Published Specifications) 2,324,134, 2,423,984, 2,512,385, 2,513,815, 2,550,796, 2,550,797, 2,550,833, 2,550,862, 2,633,293 and 2,639,254. However, it is also possible, according to U.S. Pat. No. 3,869,413 and DE-Offenlegungsschrift (German Published Specification) 2,550,860, to mix a finished aqueous polymer dispersion with a polyhydroxy compound and then to remove the water from the mixture.

Polyhydroxy compounds modified by vinyl polymers, such as are obtained, for example, by polymerization styrene and acrylonitrile in the presence of polyethers (U.S. Pat. Nos. 3,383,351, 3,304,273, 3,523,093 and 3,110,695; and DE-Auslegeschrift (German Published Specification) 1,152,536) or polycarbonatepolyols (German Pat. No. 1,769,795; and U.S. Pat. No. 3,637,909), are also suitable for the process according to the invention. If polyether-polyols which have been modified, according to DE-Offenlegungsschriften (German Published Specifications) 2,442,101, 2,644,922 and 2,646,141 by graft polymerization with vinylphosphonic acid esters and optionally (meth)acrylonitrile, (meth)acrylamide or (meth)acrylic acid esters containing OH groups are used, plastics with particular flame-repellent properties are obtained. Polyhydroxy compounds into which carboxyl groups have been introduced by free radical graft polymerization by means of unsaturated carboxylic acids and optionally further olefinically unsaturated monomers (DE-Offenlegungsschriften (German Published Specifications) 2,714,291, 2,739,620 and 2,654,746) can be particularly advantageously employed in combination with mineral fillers.

If modified polyhydroxy compounds of the abovementioned type are used as starting components in the polyisocyanate polyaddition process, polyurethane plastics with considerably improved mechanical properties are in many cases formed.

Representatives of the abovementioned compounds to be used according to the invention are described, for example, in High Polymers, Volume XVI, "Polyurethanes, Chemistry and Technology", edited by Saunders-Frisch, Interscience Publishers, New York, London, Volume I, 1962, pages 32–42 and pages 44–54 and Volume II, 1964, pages 5–6 and 198–199, and in Kunststoff-Handbuch (Plastics Handbook), Volume VII, Vieweg-Höchtlen, Carl-Hanser-Verlag, Munich, 1966, for example on pages 45–71. Mixtures of the abovementioned compounds which have a molecular weight of 400–10,000 and have at least two hydrogen atoms which are reactive towards isocyanates, for example mixtures of polyethers and polyesters, can, of course, also be employed.

In some cases, it is particularly advantageous here to combine low-melting and high-melting polyhydroxy compounds with one another (DE-Offenlegungsschrift (German Published Specification) 2,760,297).

3. Optionally as starting components: compounds which have a molecular weight of 32 to 400 and have at least two hydrogen atoms which are reactive towards isocyanates. In this case also, these compounds are understood as compounds which contain hydroxyl groups and/or amino groups and/or thiol groups and/or carboxyl groups, preferably compounds which contain hydroxyl groups and/or amino groups, and which serve as chain-lengthening agents or crosslinking agents. These compounds as a rule have 2 to 8, preferably 2 to 4, hydrogen atoms which are reactive towards isocyanates.

In this case also, mixtures of different compounds which have a molecular weight of 32 to 400 and have at least two hydrogen atoms which are reactive towards isocyanates can be used.

Examples of such compounds which may be mentioned are: ethylene glycol, propylene 1,2- and 1,3-glycol, butylene 1,4- and 2,3-glycol, pentane-1,5-diol, hexane-1,6-diol, octane-1,8-diol, neopentylglycol, 1,4-bis-hydroxymethyl-cyclohexane, 2-methyl-propane-1,3-diol, dibromobutenediol (U.S. Patent Specification 3,723,392), glycerol, trimethylolpropane, hexane-1,2,6-triol, trimethylolethane, pentaerythritol, quinitol, mannitol and sorbitol, castor oil, diethylene glycol, triethylene glycol, tetraethylene glycol, higher polyethylene glycols with a molecular weight up to 400, dipropylene glycol, higher polypropylene glycols with a molecular weight up to 400, dibutylene glycol, higher polybutylene glycols with a molecular weight up to 400, 4,4'-dihydroxydiphenylpropane, di-hydroxymethylhydroquinone, ethanolamine, diethanolamine, N-methyldietanolamine, triethanolamine and 3-aminopropanol.

Low-molecular polyols which can be used according to the invention are also mixtures of hydroxyaldehydes and hydroxyketones ("formose") or the polyhydric alcohols obtained therefrom by reduction ("formitol"), such as are formed in the condensation of formaldehyde hydrate with itself in the presence of metal compounds as a catalyst and compounds which are capable of endiol formation as a co-catalyst (DE-Offenlegungsschriften (German Published Specifications) 2,639,084, 2,714,084, 2,714,104, 2,721,186, 2,738,154 and 2,738,512). In order to obtain plastics with improved flame-repellent properties, these formoses are advantageously employed in combination with aminoplast-forming agents and/or phosphites (DE-Offenlegungsschriften (German Published Specifications) 2,738,513 and 2,738,532). Solutions of polyisocyanate polyaddition products, in particular of polyurethane-ureas containing ionic groups and/or of polyhydrazodicarboxamides, in low-molecular, polyhydric alcohols can also be used, according to the invention, as the polyol component (DE-Offenlegungsschrift (German Published Specification) 2,638,759).

Aliphatic diamines which are suitable according to the invention are, for example, ethylenediamine, 1,4-tetramethylenediamine, 1,11-undecamethylenediamine, 1,12-dodecamethylenediamine and mixtures thereof, 1-amino-3,3,5-trimethyl-5-amino-methylcyclohexane ("isophorone-diamine"), 2,4- and 2,6-hexahydrotoluylenediamine and mixtures thereof, perhydro-2,4'- and 4,4'-diaminodiphenylmethane, p-xylylenediamine, bis-(3-aminopropyl)-methylamine, diamino-perhydroanthracenes (DE-Offenlegungsschrift (German Published Specification) 2,638,731) and cycloaliphatic triamines according to DE-Offenlegungsschrift (German Published Specification) 2,614,244. It is also possible to use, according to the invention, hydrazine and substituted hydrazines, for example methylhydrazine, N,N'-dimethylhydrazine and homologues thereof, and acid dihydrazides, for example carbodihydrazide, oxalic acid dihydrazide and the dihydrazides of malonic acid, succinic acid, glutaric acid, adipic acid, β-methyladipic acid, sebacic acid, hydracrylic acid and terephthalic acid; semicarbazido-alkylene-hydrazides, such as, for example, β-semicarbazido-propionic acid hydrazide (DE-Offenlegungsschrift (German Published Specification) 1,770,591), semicarbazido-alkylene-carbazic esters, such as, for example, 2-semicarbazidoethyl-carbazic ester (DE-Offenlegungsschrift (German Published Specification) 1,918,504) or also amino-semicarbazide compounds, such as, for example, β-aminoethyl semicarbazido-carbonate (DE-Offenlegungsschrift (German Published Specification) 1,902,931). To control their reactivity, all or some of the amino groups can be blocked by aldimine groups or ketimine groups (U.S. Pat. No. 3,734,894; and DE-Offenlegungsschrift (German Published Specification) 2,637,115).

Examples of aromatic diamines which may be mentioned are bisanthranilic acid esters according to DE-Offenlegungsschriften (German Published Specifications) 2,040,644 and 2,160,590, 3,5- and 2,4-diaminobenzoic acid esters according to De-Offenlegungsschrift (German Published Specification) 2,025,900, the diamines containing ester groups described in DE-Offenlegungsschriften (German Published Specifications) 1,803,635 (U.S. Pat. Nos.) 3,681,290 and 3,736,350), 2,040,650 and 2,160,589, the diamines containing ether groups according to DE-Offenlegungsschriften (German Published Specifications) 1,770,525 and 1,809,172 (U.S. Pat. Nos. 3,654,364 and 3,736,295), 2-halogeno-1,3-phenylenediamines optionally substituted in the 5-position (DE-Offenlegungsschriften (German Published Specifications) 2,001,772, 2,025,896 and 2,065,869), 3,3'-dichloro-4,4'-diamino-diphenylmethane, toluylenediamine, 4,4'-diamino-diphenylmethane, 4,4'-diaminodiphenyl disulphides (DE-Offenlegungsschrift (German Published Specification) 2,404,976), diaminodiphenyl dithioethers (DE-Offenlegungsschrift (German Published Specification) 2,509,404), aromatic diamines substituted by alkylthio groups (DE-Offenlegungsschrift (German Published Specification) 2,638,760), diaminobenzenephosphonic acid esters (DE-Offenlegungsschrift (German Published Specification) 2,459,491), aromatic diamines containing sulphonate groups or carboxylate groups (DE-Offenlegungsschrift (German Published Specification) 2,720,166) and the high-melting diamines listed in DE-Offenlegungsschrift (German Published Specification) 2,635,400. Examples of aliphatic-aromatic diamines are the aminoalkylthioanilines according to DE-Offenlegungsschrift (German Published Specification) 2,734,574.

Compounds such as 1-mercapto-3-aminopropane, optionally substituted aminoacids, for example glycine, alanine, valine, serine and lysine, and optionally substituted dicarboxylic acids, for example succinic acid, adipic acid, phthalic acid, 4-hydroxyphthalic acid and 4-aminophthalic acid, can also be used, according to the invention, as chain-lengthening agents.

Compounds which are monofunctional with respect to isocyanates can also be simultaneously used, as socalled chain stoppers, in proportions of 0.01 to 10% by weight, relative to the polyurethane solid. Such monofunctional compounds are, for example, monoamines, such as butylamine and dibutylamine, octylamine, stearylamine, N-methylstearylamine, pyrrolidine, piperidine and cyclohexylamine, and monoalcohols, such as butanol, 2-ethylhexanol, octanol, dodecanol, the various amyl alcohols, cyclohexanol and ethylene glycol monoethyl ether.

4. As further low-molecular polyols with a molecular weight up to 400 which are suitable according to the invention: ester-diols of the general formulae

and

in which
R denotes an alkylene radical with 1-10, preferably 2-6, C atoms or a cycloalkylene or arylene radical with 6-10 C atoms,
x denotes a number from 2 to 6 and
y denotes a number from 3 to 5, for example δ-hydroxybutyl-ε-hydroxy-caproic acid ester, ω-hydroxyhexyl-γ-hydroxybutyric acid ester, adipic acid bis-(β-hydroxyethyl) ester and terephthalic acid bis(β-hydroxyethyl) ester; diol-urethanes of the general formula

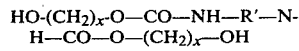

in which
R' represents an alkylene radical with 2-15, preferably 2-6, C atoms or a cycloalkylene or arylene radical with 6-15 C atoms and
x represents a number between 2 and 6,
for example 1,6-hexamethylene-bis-(β-hydroxyethylurethane) or 4,4'-diphenylmethane-bis-(δ-hydroxybutylurethane); and diol-ureas of the general formula

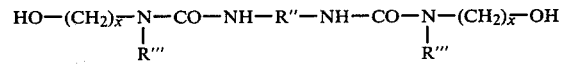

in which
R" denotes an alkylene radical with 2-15, preferably 2-9, C atoms or a cycloalkylene or arylene radical with 6-15 C atoms,
R'" denotes hydrogen or a methyl group and
x denotes the number 2 or 3, for example 4,4'-diphenylmethane-bis-(β-hydroxyethylurea) or the compound

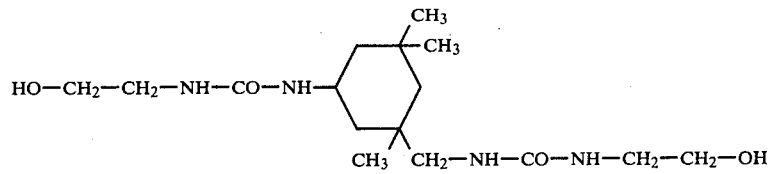

For some purposes it is advantageous to employ polyols which contain sulphonate groups and/or phosphonate groups (DE-Offenlegungsschrift (German Published Specification) 2,719,372), preferably the adduct of bisulphite and butane-1,4-diol or alkoxylation products thereof.

5. Optionally as auxiliaries and additives:

(a) Water and/or highly volatile inorganic or organic substances as blowing agents. Possible organic blowing agents are, for example, acetone, ethyl acetate, halogen-substituted alkanes, such as methylene chloride, chloroform, ethylidene chloride, vinylidene chloride, monofluorotrichloromethane, chlorodifluoromethane and dichlorodifluoromethane, and furthermore butane, hexane, heptane or diethyl ether, and possible inorganic blowing agents are, for example, air, $CO_2$ or $N_2O$. A blowing effect can also be achieved by adding compounds which decompose at temperatures above room temperature, gases, for example nitrogen, being split off, for example azo compounds, such as azodicarboxamide or azoisobutyric acid nitrile. Further examples of blowing agents and details of the use of blowing agents are described in Kunststoff-Handbuch (Plastics Handbook), Volume VII, published by Vieweg and Höchtlen, Carl-Hanser-Verlag, Munich 1966, for example on pages 108 and 109, 453 to 455 and 507 to 510.

(b) Catalysts of the type which is in itself known, for example tertiary amines, such as triethylamine, tributylamine, N-methyl-morpholine, N-ethyl-morpholine, N,N,N',N'-tetramethyl-ethylenediamine, pentamethyldiethylenetriamine and higher homologues (DE-Offenlegungsschriften (German Published Specifications) 2,624,527 and 2,624,528), 1,4-diaza-bicyclo-(2,2,2)-octane, N-methyl-N'-dimethylaminoethyl-piperazine, bis-(dimethylaminoalkyl)-piperazines (DE-Offenlegungsschrift (German Published Specification) 2,636,787), N,N-dimethylbenzylamine, N,N-dimethylcyclohexylamine, N,N-diethylbenzylamine, bis-(N,N-dietylaminoethyl) adipate, N,N,N',N'-tetramethyl-1,3-butanediamine, N,N-dimethyl-$\beta$-phenylethylamine, 1,2-dimethylimidazole, 2-methylimidazole, monocyclic and bicyclic amidines (DE-Offenlegungsschrift (German Published Specification) 1,720,633), bis-(dialkylamino)-alkyl ethers (U.S. Pat. No. 3,330,782, DE-Auslegeschrift (German Published Specification) 1,030,558 and DE-Offenlegungsschriften (German Published Specifications) 1,804,361 and 2,618,280) and tertiary amines containing amide groups (preferably formamide groups), according to DE-Offenlegungsschriften (German Published Specifications) 2,523,633 and 2,732,292). Possible catalysts are also Mannich bases, which are in themselves known, obtained from secondary amines, such as dimethylamine, and aldehydes, preferably formaldehyde, or ketones, such as acetone, methyl ethyl ketone or cyclohexanone, and phenols, such as phenol, nonylphenol or bisphenol.

Tertiary amines which can be used as the catalyst and contain hydrogen atoms which are active towards isocyanate groups are, for example, triethanolamine, triisopropanolamine, N-methyl-diethanolamine, N-ethyl-diethanolamine, N,N-dimethyl-ethanolamine, reaction products thereof with alkylene oxides, such as propylene oxide and/or ethylene oxide, and secondary-tertiary amines according to DE-Offenlegungsschrift (German Published Specification) 2,732,292.

Possible catalysts are, furthermore, sila-amines with carbon-silicon bonds, such as are described, for example, in German Pat. No. 1,229,290 (corresponding to U.S. Pat. No. 3,620,984), for example 2,2,4-trimethyl-2-silamorpholine and 1,3-diethylaminomethyl-tetramethyl-disiloxane.

Possible catalysts are also nitrogen-containing bases, such as tetraalkylammonium hydroxides, and furthermore alkali metal hydroxides, such as sodium hydroxide, alkali metal phenolates, such as sodium phenolate, or alkali metal alcoholates, such as sodium methylate. Hexahydrotriazines can also be employed as catalysts (DE-Offenlegungsschrift (German Published Specification) 1,769,043).

The reaction between NCO groups and hydrogen atoms which are active in Zerewitinoff reactions is also greatly accelerated by lactams and azalactams, an association product initially being formed between the lactam and the compound with the acidic hydrogen. Such association products and their catalytic action are described in DE-Offenlegungsschriften (German Published Specifications) 2,062,288, 2,062,289, 2,117,576 (U.S. Pat. Nos. 3,758,444), 2,129,198, 2,330,175 and 2,330,211.

According to the invention, organic metal compounds, in particular organic tin compounds, can also be used as catalysts. Possible organic tin compounds are, in addition to sulphur-containing compounds, such as di-n-octyl-tin mercaptide (DE-Auslegeschrift (German Published Specification) 1,769,367; and U.S. Pat. No. 3,645,927), preferably tin-II salts of carboxylic acids, such as tin-II acetate, tin-II octoate, tin-II ethyl-hexoate and tin-II laurate, and the tin-IV compounds, for example dibutyl-tin oxide, dibutyl-tin dichloride, dibutyl-tin diacetate, dibutyl-tin dilaurate, dibutyl-tin maleate or dioctyl-tin diacetate.

All the abovementioned catalysts can, of course, be employed as mixtures. Combinations of organic metal compounds and amidines, aminopyridines or hydrazinopyridines are of particular interest (DE-Offenlegungsschriften (German Published Specifications) 2,434,185, 2,601,082 and 2,603,834).

Further representatives of catalysts to be used according to the invention and details on the mode of action of the catalysts are described in Kunststoff-Handbuch (Plastics Handbook), Volume VII, published by Vieweg and Höchtlen, Carl-Hanser-Verlag, Munich 1966, for example on pages 96 to 102.

The catalysts are as a rule employed in an amount of between about 0.001 and 10% by weight, relative to the total amount of compounds with at least two hydrogen atoms which are reactive towards isocyanates.

(c) Surface-active additives, such as emulsifiers and foam stabilizers. Possible emulsifiers are, for example, the sodium salts of castor oil sulphonates or salts of fatty acids with amines, such as of oleic acid and diethylamine or stearic acid and diethanolamine. Alkali metal salts or ammonium salts of sulphonic acids, such as, for example, of dodecylbenzenesulphonic acid or dinaphthylmethanedisulphonic acid, or of fatty acids, such as castor oil acid, or of polymeric fatty acids can also simultaneously be used as surface-active additives.

In addition to the foam stabilizers prepared according to the invention, further stabilizers can also additionally be used, that is to say as mixtures.

Possible foam stabilizers are, above all, polyether-siloxanes, in particular water-soluble representatives. These compounds are in general built up in a manner such that a copolymer of ethylene oxide and propylene oxide is bonded to a polydimethylsiloxane radical. Such foam stabilizers are described, for example, in U.S. Pat. No. 2,834,748, 2,917,480 and 3,629,308. Polysiloxane/polyoxyalkylene copolymers branched via allophanate groups, according to DE-Offenlegungsschrift (German Published Specification) 2,558,523, are frequently of particular interest.

(d) Reaction retarders, for example acid substances, such as hydrochloric acid or organic acid halides, and furthermore cell regulators of the type which is in itself known, such as paraffins or fatty alcohols or dimethylpolysiloxanes, and pigments or dyestuffs and flame-proofing agents of the type which is in itself known, for example tris-chloroethyl phosphate, tricresyl phosphate or ammonium phosphate and polyphosphate, and furthermore stabilizers against ageing and weathering influences, plasticizers and substances having a fungistatic and bacteriostatic action, as well as fillers, such as barium sulphate, kieselguhr, carbon black or whiting.

Further examples of compounds which are optionally also to be used according to the invention, that is to say surface-active additives and foam stabilizers, as well as cell regulators, reaction retarders, stabilizers, flame-proofing substances, plasticizers, dyestuffs and fillers, and also substances having a fungistatic and bacteriostatic action, as well as details of the method of use and mode of action of these additives are described in Kunststoff-Handbuch (Plastics Handbook), Volume VII, published by Vieweg and Höchtlen, Carl-Hanser-Verlag, Munich 1966, for example on pages 103 to 113.

PROCEDURE FOR THE PROCESS ACCORDING TO THE INVENTION

According to the invention, the reaction components are reacted by the one-stage process which is in itself known, the prepolymer process or the semi-prepolymer process, mechanical devices frequently being used, for example those which are described in U.S. Pat. No. 2,764,565. Details of processing devices which can also be used according to the invention are described in Kunststoff-Handbuch (Plastics Hand-Book), Volume VII, published by Vieweg and Höchtlen, Carl-Hanser-Verlag, Munich 1966, for example on pages 121 to 205.

In the production of the foam, the foaming can also be carried out, according to the invention, in closed molds. The reaction mixture is introduced into a mold. Possible materials for the mold are metal, for example aluminum or plastic, for example epoxide resin. The reaction mixture which is capable of foaming foams in the mold and forms the shaped article. The foaming in the mold can be carried out such that the surface of the molding has a cellular structure, but it can also be carried out such that the molding has a compact skin and a cellular core. In this connection, the procedure followed, according to the invention, can be to introduce the reaction mixture, which is capable of foaming, into the mold in an amount such that the foam formed just fills the mold. However, it is also possible to follow a procedure in which more reaction mixture, which is capable of foaming, than is necessary to fill the inside of the mold with foam is introduced into the mold. In the latter case, the "overcharging" procedure is followed; such a procedure is known, for example, from U.S. Pat. Nos. 3,178,490 and 3,182,104.

"External release agents" which are in themselves known, such as silicone oils, are frequently also used during the foaming in the mold. However, it is also possible to use so-called "internal release agents", such as have been disclosed, for example, in DE-Offenlegungsschriften (German Published Specifications) 2,121,670 and 2,307,589, optionally mixed with external release agents.

Cold-curing foams can also be produced according to the invention (compare British Pat. No. 1,162,517 and DE-Offenlegungsschrift (German Published Specification) 2,153,086).

However, it is, of course, also possible to produce foams by block foaming or by the twin conveyor belt process, which is in itself known.

The process according to the invention and the use according to the invention will be illustrated in more detail with the aid of the following examples:

Acetoxypolysiloxanes prepared according to DEOS (German Published Specification) 2,802,668:

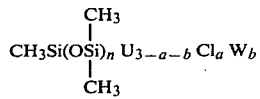

wherein
$a+b \leq 0.5$ and
W denotes a $C_4F_9SO_3$ radical, and polyethers started from butanol and containing ethylene oxide units and propylene oxide units in alternating sequence:

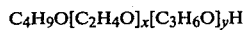

were used for the preparation of the polyether-siloxanes.

A siloxane precursor with the theoretical composition

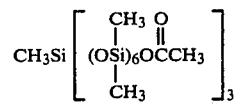

is prepared, for example, as follows:

299 g (2 mols) of methyltrichlorosilane are added to a mixture of 9 6 (0.3%) of perfluorobutanesulphonic acid and then 2,664 g (9 mols) of octamethylcyclotetrasiloxane. The mixture is then heated to 90° C. and 600 g (10 mols) of acetic acid are added in the course of 2 hours. During the addition, the mixture is heated further such that, when the addition has ended (stream of HCl ceases), the temperature has reached 130° C. The mixture is then stirred at 130° C. for 2 hours. Thermal devolatilization is effected at 130° C. and under 67 mbars.

Yield: 2,949.7 g.
Acetate: 190 mequivalents/100 g.

EXAMPLE 1

500 g [ $\triangleq$ 1.02 equivalents of acetate] of an acetoxypolysiloxane with an index n of 16.89 are stirred with 2,000 g of dried toluene. A mixture consisting of 1,477.3 g [0.79 equivalent] of a polyether (with a molecular weight MW of 1,870 and an ethylene oxide content of 45% by weight and a propylene oxide content of 55% by weight), 10.35 g [0.23 equivalent] of butane-2,3-diol and 1,500 g of dried toluene is added to the above mixture at room temperature in the course of 15 minutes. 17.34 g of dried $NH_3$ are passed into the mixture in the course of about 2 hours (at about 8.67 g/hour) without heating the mixture, until the mixture is saturated.

The mixture is then heated to 70° C. in the course of 30 minutes, during which the stream of ammonia is increased to 11.79 g/hour. After adding an excess of 5% [=73.9 g] of the above polyether, dissolved in 500 g of dried toluene, the mixture is stirred for a further 90 minutes. It is then cooled slowly. The stream of $NH_3$ is disconnected 30 minutes after the start of the cooling phase.

The solution, which is very turbid as a result of the salt, is filtered and the filtrate is subjected to thermal devolatilization at a maximum temperature of 100° C. and under 20 mbars. 20 g of diethylaminoethanol are added to the clear, slightly yellow-colored residue.

Yield: 2,008.5 g.
$\eta$: 640 m pas. sec.
$n_D^{20}$: 1.4475.

EXAMPLE 2

500 g [ $\triangleq$ 1.01 equivalents of acetate] of acetoxypolysiloxane with an index n of 17.1 are reacted with the polyether [1,477.3 g] described in Example 1 in the presence of 9.9 g [0.22 equivalent) of butane-2,3-diol etc., by the process described in Example 1.

Yield: 1,975 g.
$\eta$: 680 m pas. sec.
$n_D^{20}$: 1.4473.

EXAMPLE 3

500 g [ $\triangleq$ 1.865 equivalents of

of acetoxypolysiloxane with an index n of 7.89 are stirred with 2,000 g of dried toluene. A mixture consisting of 2,503.2 g [1.120 equivalents] of a polyether (with a molecular weight MW of 2,235 and an ethylene oxide content of 41.5% by weight and a propylene oxide content of 58.5% by weight), 33.5 g [0.745 equivalent] of butane-2,3-diol and 1,500 g of toluene is added to the above mixture at room temperature in the course of 20 minutes.

About 32 g of $NH_3$ are passed into the mixture in the course of 2 hours without heating the mixture, until the mixture is saturated. The mixture is then heated to 70° C. in the course of 15 minutes. During this period, the supply of $NH_3$ is increased to 21.9 g/hour. After adding 125.2 g [ ≙ 5%] of the above polyether, dissolved in 500 g of toluene, the mixture is stirred for a further 1 hour and 45 minutes. It is then cooled slowly. The stream of $NH_3$ is disconnected 30 minutes after the start of the cooling phase, and the procedure followed is as described in Example 1.

A yellow transparent product is formed.

Yield: 2,782 g.

$\eta$: 2,580 m pas. sec.

$n_D^{20}$: 1.4532.

EXAMPLE 4

500 g [ ≙ 1.660 equivalents of acetate] of an acetoxypolysiloxane with an index n of 9.24 are reacted with 1,958 g [0.850 equivalent] of a polyether (with a molecular weight MW of 2,304 and an ethylene oxide content of 41.5% by weight and a propylene oxide content of 58.5% by weight) and 36.5 g [0.81 equivalent] of butane-2,3-diol etc., by the process described in Example 3.

Yield: 2,452 g.

$\eta$: 1.800 m pas . sec.

$n_D^{20}$: 1.4508.

EXAMPLE 5

(Foaming Example)

A soft block foam was produced on a continuously operating high-pressure machine (Messrs. Hennecke) using the following recipe: 100 parts by weight of an ethylene oxide/propylene oxide polyol started from trimethylolpropane, with an OH number of 35 and an average molecular weight of 4,800, 31.8 parts by weight of diisocyanatotoluene (a mixture of 2,4-diisocyanatotoluene and 2,6-diisocyanatotoluene in the ratio 80:20), 31.8 parts by weight of diisocyanatotoluene (a mixture of 2,4-diisocyanatotoluene and 2,6-diisocyanatotoluene in the ratio 65:35); diisocyanatotoluene index: 105, 1.4 parts by weight of the stabilizer from Example 1, 0.12 part by weight of a mixture of a silamorpholine with a commercially available tertiary amine, 0.25 part by weight of tin-II octoate and 5.5 parts by weight of water.

The rise time is 53 seconds and the setting time is 26 seconds.

The resulting foam has an open-cell structure and is free from deformations.

EXAMPLE 6

(Foaming Example)

A further soft block foam was produced on the machine mentioned in Example 5, using the following recipe: 100 parts by weight of an ethylene oxide/propylene oxide polyol started from trimethylolpropane, with an OH number of 35 and an average molecular weight of 4,800, 26.8 parts by weight of diisocyanatotoluene (a mixture of 2,4-diisocyanatotoluene and 2,6-diisocyanatotoluene in the ratio 65:35); diisocyanatotoluene index: 105, 0.6 part by weight of the stabilizer from Example 1, 0.22 part by weight of a mixture of a silamorpholine with a commercially available tertiary amine, 0.16 part by weight of tin-II octoate and 2.0 parts by weight of water.

The rise time is 120 seconds and the setting time is 65 seconds.

The resulting foam has an open-cell structure and is free from deformations.

EXAMPLE 7

(Foaming Example)

A soft block foam which is free from deformations was produced on the machine mentioned in Example 5, using the following recipe: 100 parts by weight of an ethylene oxide/propylene oxide polyol started from trimethylolpropane, which is modified with 20% by weight of a fine-particled, polymeric organic filler. 23.3 parts by weight of diisocyanatotoluene (a mixture of 2,4-diisocyanatotoluene and 2,6-diisocyanatotoluene in the ratio 80:20), 23.3 parts by weight of diisocyanatotoluene (a mixture of 2,4-diisocyanatotoluene and 2,6-diisocyanatotoluene in the ratio 65:35); diisocyanatotoluene index: 105, 1.2 parts by weight of the stabilizer from Example 2, 0.15 part by weight of triethylenediamine, 0.20 part by weight of dimethylethanolamine, 0.20 part by weight of tin-II octoate and 4.0 parts by weight of water.

The reaction time is 70 seconds and the setting time is 39 seconds.

EXAMPLE 8

(Foaming Example)

A further soft block foam was produced on the machine mentioned in Example 5, using the following recipe: 100 parts by weight of an ethylene oxide/propylene oxide polyol started from trimethylolpropane, which is modified with 20% by weight of a fine-particled, polymeric organic filler, 18.4 parts by weight of diisocyanatotoluene (a mixture of 2,4-diisocyanatotoluene and 2,6-diisocyanatotoluene in the ratio 65:35); diisocyanatotoluene index: 120, 0.7 part by weight of the stabiliser from Example 2, 0.7 part by weight of a mixture of a silamorpholine with a commercially available tertiary amine, 0.3 part by weight of dimethylethanolamine, 0.1 part by weight of tin-II octoate and 1.1 parts by weight of water.

The reaction time is 195 seconds and the setting time is 120 seconds.

The resulting foam has an open-cell structure and is free from deformations.

EXAMPLE 9

(Foaming Example)

A soft block foam was produced on the same machine as in Example 5, using the following recipe: 100 parts by weight of a partially branched ethylene oxide/propylene oxide polyol with an OH number of 51 and an average molecular weight of 2,800, 38.5 parts by weight of diisocyanatotoluene (a mixture of 2,4-diisocyanatotoluene and 2,6-diisocyanatotoluene in the ratio 80:20); diisocyanatotoluene index: 105, 0.8 part by weight of the stabilizer from Example 3, 0.15 part by weight of a mixture of a silamorpholine with a commercially available tertiary amine, 0.40 part by weight of a commercially available tertiary amine, 0.2 part by weight of tin-II octoate and 3.0 parts by weight of water.

The rise time is 101 seconds and the setting time is 28 seconds.

The resulting foam has an open-cell structure and is free from deformations.

Its physical data were determined as follows:

| | |
|---|---|
| Overall density [kg/m$^3$] | 32 |
| Tensile strength [KPa] | 141 |
| Elongation at break [%] | 318 |
| Compressive strength (40%) [KPa] | 3.8 |
| Permanent set (90%) [%] | 2.7 |

After the Ford test, the compressive strength was 2.8 PKa (accordingly a 26% decrease in the compressive strength) and the permanent set (90%) was 4.3%.

EXAMPLE 10

(Foaming Example)

A further soft block foam was produced on the high-pressure machine mentioned in Example 5, using the following recipe: 100 parts by weight of an ethylene oxide/propylene oxide polyol started from trimethylolpropane, with an OH number of 45, 38.8 parts by weight of diisocyanatotoluene (a mixture of 2,4-diisocyanatotoluene and 2,6-diisocyanatotoluene in the ratio 80:20); diisocyanatotoluene index: 105, 0.7 part by weight of the stabilizer from Example 4, 0.25 part by weight of a mixture of a silamorpholine with a commercially available tertiary amine, 0.15 part by weight of tin-II octoate and 3.0 parts by weight of water.

The rise time is 108 seconds and the setting time is 34 seconds.

The resulting foam has an open-cell structure and is free from deformations.

The physical data were determined as follows:

| | |
|---|---|
| Overall density [kg/m$^3$] | 32 |
| Tensile strength [KPa] | 114 |
| Elongation at break [%] | 200 |
| Compressive strength (40%) [KPa] | 4.2 |
| Permanent set (90%) [%] | 2.9 |

After the Ford test, the permanent set (90%) was 3.2% and the decrease in compressive strength was 23%.

It will be appreciated that the instant specification and examples are set forth by way of illustration and not limitation, and that various modifications and changes may be mad without departing from the spirit and scope of the present invention.

We claim:

1. A process for the preparation of a polyorganopolysiloxane of the formula $$[R^1Si(OSiR_2)_n]_m Z_{m-1} (OR^2)_{m+2}$$

in which
R is an optionally halogen-substituted alkyl group with up to 4 C atoms,
R$^1$ is the substituent R or a phenyl radical,
R$^2$ is an aliphatic, optionally unsaturated radical with up to 18 C atoms or a group of the formula $$R^3(OCH_2CH_2)_x(OCH_2\overset{CH_3}{\underset{|}{CH}})_y-,$$

Z is the difunctional unit —O— or $$-O\begin{bmatrix} R^4 \\ | \\ C- \\ | \\ R^4 \end{bmatrix}_p O-,$$

R$^3$ is a hydrocarbon radical with up to 4 C atoms,
R$^4$ each independently is a hydrogen atom or R$^3$,
n is from 3 to 30,
m is from 1 to 15,
x is from 0 to 68,
y is from 0 to 52,
x+y is from 1 to 68, and
p is from 2 to 12,
comprising reacting an organopolysiloxane of the formula $$R^1Si(OSiR_2)_n U_{3-a-b}Cl_a W_b$$

in which
U is a radical of a lower monobasic carboxylic acid with up to 4 C atoms,
W is a radical of a fluorinated alkanesulphonic acid,
a ≦ 1, and
b ≦ 0.5,
with a mixture of R$^2$OH and H-Z-H, in the presence of a base in an organic solvent, the relative proportions of the reactants being determined by the value of m.

2. A process according to claim 1, wherein the organo polysiloxane is obtained by reacting R$^1$SiCl$_3$ with a diorganopolysiloxane in the presence of a fluorinated alkanesulphonic acid or salt thereof in an excess of monobasic carboxylic acid of the formula U-H.

* * * * *